US009178902B1

(12) United States Patent
Zagorsky et al.

(10) Patent No.: US 9,178,902 B1
(45) Date of Patent: Nov. 3, 2015

(54) SYSTEM AND METHOD FOR DETERMINING ENTERPRISE INFORMATION SECURITY LEVEL

(71) Applicant: Kaspersky Lab ZAO, Moscow (RU)

(72) Inventors: Sergey G. Zagorsky, Moscow (RU); Andrey P. Doukhvalov, Moscow (RU); Andrey B. Lavrentyev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/526,638

(22) Filed: Oct. 29, 2014

(51) Int. Cl.
*H04L 29/06* (2006.01)
*G06F 21/50* (2013.01)

(52) U.S. Cl.
CPC ........ *H04L 63/1433* (2013.01); *H04L 63/1416* (2013.01); *G06F 21/50* (2013.01)

(58) Field of Classification Search
None
See application file for complete search history.

(56) References Cited

U.S. PATENT DOCUMENTS

| | | |
|---|---|---|
| 6,906,709 B1 | 6/2005 | Larkin et al. |
| 2006/0031048 A1* | 2/2006 | Gilpin et al. ............ 703/6 |
| 2006/0191007 A1 | 8/2006 | Thielamay |
| 2007/0087763 A1* | 4/2007 | Budampati et al. ........ 455/456.5 |
| 2007/0168204 A1* | 7/2007 | Dawson et al. ................ 705/1 |
| 2010/0153785 A1* | 6/2010 | Keromytis et al. ............. 714/38 |
| 2014/0245449 A1* | 8/2014 | Powell et al. .................. 726/25 |

FOREIGN PATENT DOCUMENTS

EP    2192543 A1 *  6/2010

\* cited by examiner

*Primary Examiner* — Benjamin Lanier
*Assistant Examiner* — Malcolm Cribbs
(74) *Attorney, Agent, or Firm* — Arent Fox; Michael Fainberg

(57) ABSTRACT

Disclosed are systems, methods and computer program product for determining information security level for an enterprise. An example method comprising: collecting information relating to a structure of the enterprise, including a plurality of elements of the enterprise; creating a model to correspond to each element of the enterprise based on at least one function of each element; identifying criteria to evaluate an effectiveness of the at least one function of each element; simulating operation of the elements and determining effectiveness of the at least one function of each simulated element, wherein simulating includes determining different sequences of events and actions in response to the events for one or more simulation iterations based on the effectiveness of the at least one function of each element; and determining an information security level for the enterprise by maximizing the effectiveness of functions of the elements in response to events.

18 Claims, 3 Drawing Sheets

SYSTEM AND METHOD FOR DETERMINING ENTERPRISE INFORMATION SECURITY LEVEL

FIELD OF TECHNOLOGY

The present disclosure relates generally to the field of information security, and, more specifically, to systems and methods of determining an information security level for an enterprise.

BACKGROUND

When it comes to enterprise and business control, computer simulation makes it possible to test equipment, evaluate processing methods, and analyze costs without using valuable production time or risking equipment damage. During simulation, various enterprise elements and activities may be modeled as a collection of tasks and events with a defined execution or action sequence specified by connections and control structures in accordance with corresponding enterprise resources including time, money, labor cost, energy cost, and space. As such, one may use a computer system to monitor enterprise manufacture throughput, examine equipment status and locations, check for interference and malfunctions within the enterprise.

However, it is challenging to analyze dynamic behavior of complex enterprises or systems in view of circular, interlocking, sometimes time-delayed relationships among various enterprise elements to achieve the highest effectiveness of production and profit. In addition, modern enterprises, which typically involve numerous and complex electronic and mechanical devices, constantly confront threats to equipment hardware (e.g., sensors and controllers), and threats to the underlying IT systems of networks that support the processing and communication of the equipment. In recent years, these threats have been exacerbated due to the fact that computerized control systems of a specific enterprise are increasingly becoming remotely accessible and linked to various inter or intra enterprise networks, which makes it relatively easy for hackers to launch malware attacks to compromise enterprise production equipment and IT security.

Thus, it is desirable to determine an information security level of an enterprise system with a dynamic system model taking into account the current, historical, and general behavior of various system elements with the aid of computer simulation to achieve the highest effectiveness of production and security.

SUMMARY

Disclosed are systems, methods and computer program products for determining an information security level for an enterprise. In one aspect, an example method includes collecting information relating to a structure of the enterprise, the structure including a plurality of elements of the enterprise; creating a model to correspond to each of the plurality of elements of the enterprise based on at least one function of each element; identifying criteria to evaluate an effectiveness of the at least one function of each element; simulating operation of the elements of the enterprise and determining effectiveness of the at least one function of each simulated element, wherein simulating includes determining different sequences of events and actions in response to the events for one or more simulation iterations based on the effectiveness of the at least one function of each element; and determining an information security level for the enterprise by maximizing the effectiveness of the at least one function of each element in response to events.

In one example aspect, the events may comprise one or more of: previously occurred events in the enterprise, events occurred in a different enterprise, random events, and events relating to malware attacks, user actions, and each element of the enterprise.

In one example aspect, each of the actions in response to the events may be determined by one or more of: a name; a description; an impact on the one or more simulation iterations; a cost of implementing; a negative impact on an enterprise profit; an implementation time; a dependency on other actions or states of the enterprise; a permanency; and a priority in relation to other actions.

In one example aspect, the method may further include performing each of the one or more simulation iterations by obtaining an initial state for each element including at least one of: common events of the one or more simulation iterations with one or more obvious or hidden causes; individual events for each element; a combined profit of the enterprise for past iterations; and an enterprise profit of a last iteration.

In one example aspect, the individual events for each element comprise previously occurred events and action undertaken only for a specific element in a prior simulation.

In one example aspect, the method may further include determining a coefficient of effectiveness of the enterprise based on the identified criteria for evaluating the effectiveness of the at least one function of each element.

In one example aspect, the method may further include analyzing results of the one or more simulation iterations to determine a simulation with the highest coefficient of effectiveness.

In one example aspect, each of the one or more simulation iterations comprises one or more simulation loops, and the method may further include: performing the one or more simulation loops in each of the one or more simulation iterations using a corresponding model for each element; and analyzing results of the one or more simulation loops for selecting the highest coefficient of effectiveness based on a fuzzy logic analysis or a supplemental analysis.

In one example aspect, the method may further include determining a threshold for the actions in response to the events for each of the one or more simulation iterations based at least in part on a cost of performing the actions.

In one example aspect, the criteria to evaluate the effectiveness of the at least one function of each element comprise at least one of: a profit in a current simulation iteration; and overall profit of the enterprise after the current simulation iteration; and a working capability of production equipment and computer systems in and after the current simulation iteration.

In one aspect, an example system for determining an information security level for an enterprise includes: an information collection module for collecting information relating to a structure of the enterprise, the structure including a plurality of elements of the enterprise; a modeling module for creating a model to correspond to each of the plurality of elements of the enterprise based on at least one function of each element; an analysis module for identifying criteria to evaluate an effectiveness of the at least one function of each element; and an action selection module for determining different sequences of events and actions in response to the events for one or more simulation iterations based on the effectiveness of the at least one function of each element, wherein the analysis module is further configured to determine an information security level for the enterprise by maximizing the effectiveness of the at least one function of each element in response to events.

In one aspect, an example computer program product, stored in a non-transitory computer-readable storage medium, comprises computer-executable instructions for determining an information security level for an enterprise, including instructions for: collecting information relating to a structure of the enterprise, the structure including a plurality of elements of the enterprise; creating a model to correspond to each of the plurality of elements of the enterprise based on at least one function of each element; identifying criteria to evaluate an effectiveness of the at least one function of each element; simulating operation of the elements of the enterprise and determining effectiveness of the at least one function of each simulated element, wherein simulating includes determining different sequences of events and actions in response to the events for one or more simulation iterations based on the effectiveness of the at least one function of each element; and determining an information security level for the enterprise by maximizing the effectiveness of the at least one function of each element in response to events.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for determining an information security level for an enterprise. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The disclosed aspects of systems, methods and computer program products may simulate the control of an enterprise. An example system may involve at least two kinds of resources—time and money. Other types of resources may also be factored in—such as man-hours, energy costs and space. During the simulation, the system may perform at least one iteration. A predetermined finite quantity of resources may be expended on each iteration.

Figure 1:
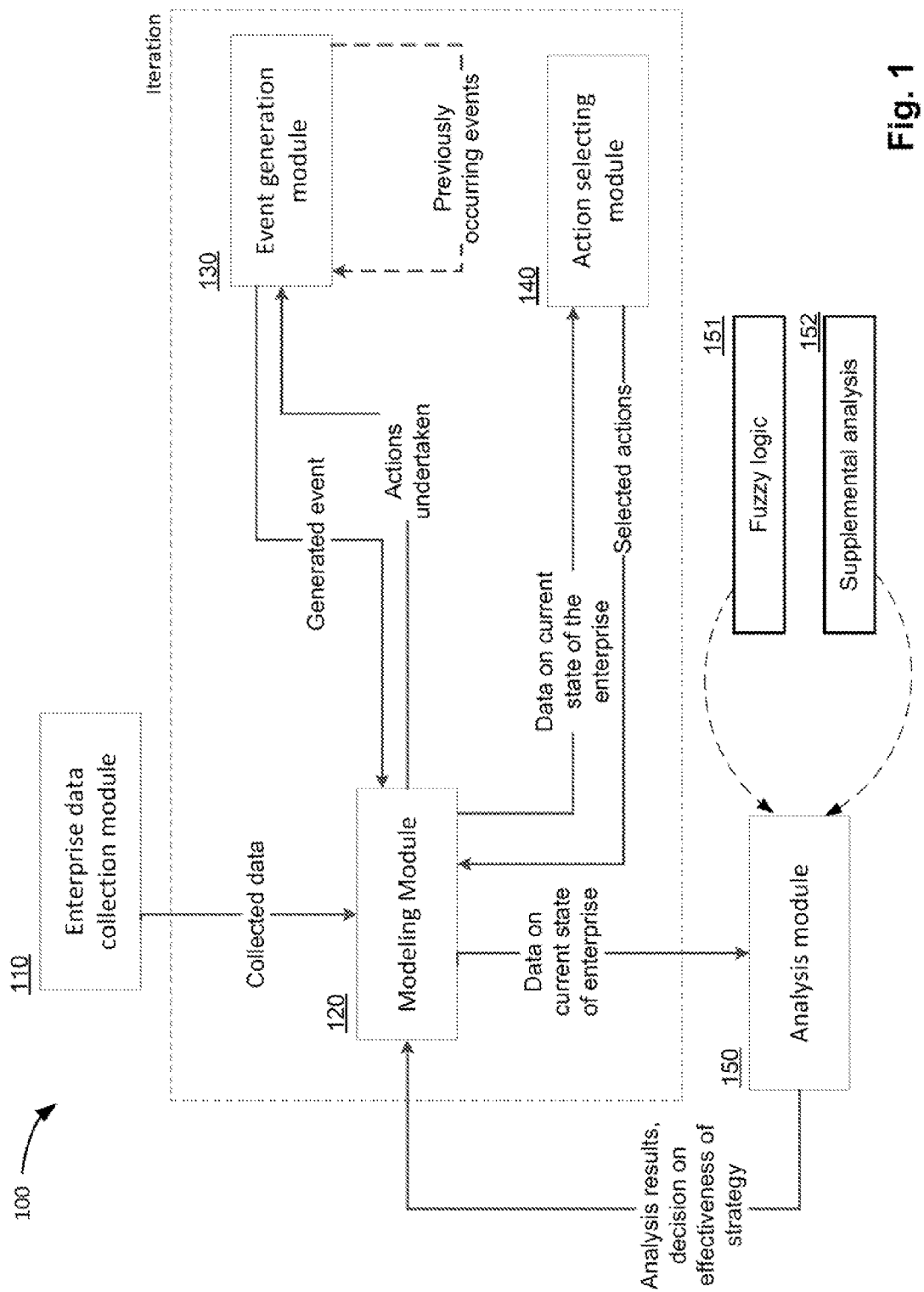
FIG. 1 illustrates a block diagram of an example system for determining an information security level for an enterprise.

FIG. 1 illustrates an example structure of a system for determining an information security level for an enterprise. In one aspect, a system 100 may include an enterprise data collection module 110 configured to collect data related to a structure of the enterprise, including, but not limited to production equipment of the enterprise, control systems for the production equipment, and computer systems of the enterprise. The production equipment of the enterprise may include devices, such as machines, tools, and conveyors, and controllers that control the devices. The computer systems of the enterprise may include, but not limited to computer servers, user workstations, communication channels with the controllers of the production equipment and with external servers, mobile devices and information storage media. Subsequently, on the basis of the collected data, criteria may be identified for the structure elements of the enterprise. The criteria may be related to profit per unit of time, functionality of system elements, and other data.

In another example aspect, the system 100 further includes a modeling module 120 configured to model the operation of the enterprise, by using the data collected by the data collection module 110, to generate a structure of the enterprise and to create a model for the operation of the elements of the enterprise, based on the generated enterprise structure. For each element of the enterprise, an element of the enterprise model may be created. The elements of the enterprise model may have the same criteria as the elements of the enterprise. It should be noted that the elements of the enterprise may be identified in different ways down to different level of depths. For example, the production equipment may contain a command controller and hardware in one enterprise model, and in a more complex model, the hardware may be divided into individual devices and each respective control units (for example, a conveyor may include feed mechanisms, drive units, motors, and control units).

In one example aspect, the effectiveness of operation of elements of the enterprise model may be assessed based on the indicated criteria, for example, if the production equipment is working, then it may have the greatest functionality and largest profit in such working conditions. If problems arise in the production equipment, both the functionality and the profit, as well as the functional effectiveness of other elements based on each respective defined criteria, may decrease at the same time. To assess the functional effectiveness, a coefficient may be used, and such a coefficient may be calculated based on the criteria of the elements of the enterprise model. The coefficient of effectiveness may be calculated in any known manner, for example, by the sum of criteria, by the sum of criteria multiplied by a coefficient of importance of the criterion, by the intersection of sets, and other methods.

In one example aspect, the enterprise elements and the interactions therebetween may be described, for example, by using finite state machines.

In one example aspect, the modeling module 120 may use scenarios representing sequences of events occurring at various stages of the simulation of the control of the enterprise. The scenarios may be based on real events from the history of the given or another enterprise including, e.g., stereotypical events (such as a previously developed general model of development of the enterprise), and may use certain random events (such as malfunction of equipment with no obvious cause). At each stage, it may be necessary to make a decision on what to do in the current situation by selecting at least one action. Depending on previously performed actions, the events defined in the scenario may or may not happen. For example, malicious software may be unable to work and cause harm to the enterprise if it infects a computer of the enterprise with antivirus software installed on it.

In another example aspect, a simulation of the control of the enterprise may include a number of iterations. An iteration may include different types of events, a choice of actions, and calculation of the consequences of actions for different elements or groups of elements.

One of the basic problems in creating a model of the enterprise may involve selecting the most balanced set of parameters for the influence of events on the elements of the enterprise. For example, a change in the software of the controllers of the production equipment may reduce the productivity of this equipment by an amount specified by the model, disconnecting the network communication of the enterprise with an external server may reduce the profit of the enterprise by an amount specified by the model, and so forth. If the enterprise is producing a product and has two lines of production equipment, which may provide a combined revenue of 100,000 units of profit per iteration, a disruption in the working capability of one line (for example, due to the action of malicious software which updated the program of a microcontroller of the line) may result in a partial or total unsuitability of the product produced by the line, which may lower the profit of one line to zero, and the combined profit of the enterprise to 50,000 units.

It should be noted that the simulation of the control of the enterprise may be run for the same enterprise model many times, with different scenarios.

In one example aspect, a module of generating events 130 may generate and transmit to the modeling module 120 events related to a decrease in the coefficient of effectiveness of the elements of the enterprise model. The event generating module 130 may create events taking into account previously occurred events and actions undertaken based on the data received from the modeling module 120. For example, if an antivirus software has been installed on a workstation, then this computer may not be infected with a virus. If the corporate network was segmented in one of the iterations, then, if malicious software penetrates the network segment, it may only be effective within the bounds of this segment. If during one of the iterations an equipment and network audit was performed, unknown devices (such as mobile personal computers) which are potential carriers of malicious software may be unable to appear in the network after the completion of the iteration.

It should be noted that, in addition to the events defined in advance in the scenario, there may also be events related to attacks from the outside, user actions, and also elements of the model. For example, regardless of the current state of the enterprise, an outside hacker attack may commence on all computer systems of the enterprise (database server, site, SCALA server). As a result, user's computer may be infected with a virus without identified security problems, or production equipment may fail without obvious cause.

A module of selection of actions 140, depending on the current state of the model of the enterprise received from the modeling module 120, may select actions to increase the coefficient of effectiveness of the elements of the enterprise model. The module of selection of actions 140 may make possible a selection of actions in consideration of previously occurred events and actions undertaken based on the data obtained from the modeling module 120. For example, if a network firewall has been installed to counter an external attack during one of the preceding iterations, it cannot not be installed again in the current iteration.

In another example aspect, a finite number of actions may be provided in the system. The following may be determined for each action:
  name;
  description;
  impact on the simulation process;
  cost of implementing it;
  negative impact on enterprise profit;
  time to implement it;
  dependency on other actions or states;
  permanency (a permanent action may never occur, or may occur once; if it has occurred, it ceases to be available in subsequent iterations);
  priority in relation to other actions.

A finite number of actions may be used in one iteration. The limitation on the number of actions may depend on the overall cost of performing the actions (limit on resources per iteration), a threshold value for the number of actions per iteration, or other criteria.

An analysis module 150, depending on the current state of the model of the enterprise that was obtained from the modeling module 120, may select the most effective action to ensure the information or computer security level of the enterprise. The computer security being ensured by an action if, after an event has occurred, the selected action may achieve the largest coefficient of effectiveness of the elements of the enterprise model. In one example aspect, the criteria of effectiveness may be determined by the scenario of the iteration and may take into account the profit in the current iteration, the overall profit of the enterprise after the current iteration, the working capability of the production equipment and computer systems in the current iteration, and their working capability after the current iteration.

In yet another example aspect, the system may perform the simulation using at least one simulation loop. A simulation loop may include a sequence of sets of events occurring in the iterations and undertaken actions. The starting state of the model of the enterprise may be common to all the simulation loops. But the states of the model of the enterprise for the individual loops in each iteration resulting from the actions chosen and the events occurring may not depend on each other, thus the current simulation loop may branch in each iteration, according to the chosen set of actions. The data for each simulation loop may be collected in the analysis module 150. It should be noted that the analysis of a selection may make use of fuzzy logic 151. For example, if at the end of one simulation the resulting profit is 500,000 units, but the working capability of the production equipment does not exceed 10% of the maximum productivity, while at the end of a second one the profit is 300,000 units, but the equipment is working at 90% of its capability, the determination of the effectiveness of strategies (the choice of actions for the simulation) may make use of fuzzy sets (productivity of the production equipment and profit) and depend on the intersection of these fuzzy sets. It should also be noted that the choice may make use of a supplemental analysis 152 after the completion of the iterations specified by the scenario. For example, if throughout the simulation the production equipment of the enterprise did not lose more than 25% of its productivity in any iteration, the chosen strategy may be deemed as being more effective.

Figure 2:
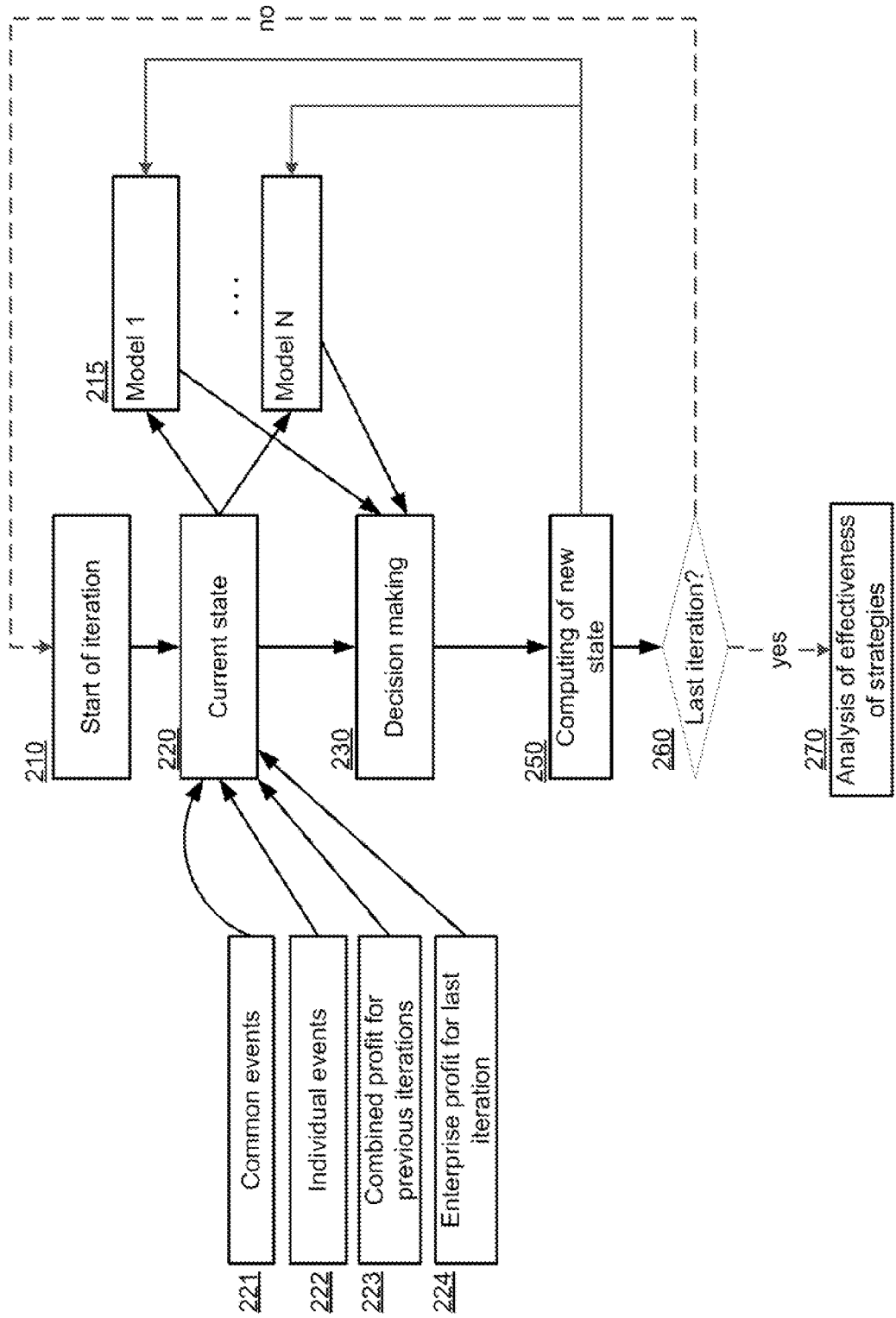
FIG. 2 illustrates a flow diagram of an example method for determining an information security level for an enterprise.

FIG. 2 shows an example structure of an iteration in accordance to aspects of the invention. At the start of iteration 210, all the elements of the model 215 may simultaneously obtain their state 220, which may include:
 a) common events of the iteration 221;
 b) individual events for the model elements at the start of the iteration 222;
 c) combined profit of the enterprise for past iterations 223;
 d) enterprise profit for the last iteration 224.

The common events of the iteration, when occur, may have an obvious or a hidden, as well as one or more causes of occurrence. For example, a common attack on the database server of the enterprise may commence, and may have one obvious cause (the target of the attack is known, the attack occurs independently of the state of the enterprise). A decrease in the quality of product on the production equipment may have a hidden cause and several possible causes of occurrence. For example, it may not be clear what is adversely affecting the working of the production equipment, whether a machine or controller breaks down, or whether the equipment failure is caused by the action of malicious software.

In yet another example aspect, individual events for the elements of the model may have the same description as the common events (they may have an obvious or hidden cause, as well as several causes of occurrence), but they may occur in consideration of previously occurred events and actions undertaken only for specific model elements. For example, if, during a prior simulation, a segment of the enterprise network was isolated, checked for a presence of malware and disinfected, the cause of malfunction of the production equipment in this segment may only be the breakdown of a controller or a machine.

The events occurring (those which are common and those individual to the model elements) may not be mutually contradictory, which may be ensured by the rules for generating of events.

The system may select corresponding actions to counter the common and individual events in stage 230, and the iteration may conclude, and the system may compute a new state 250.

A new iteration may then begin, and all the steps may be repeated until the simulation scenario is completed 260.

After the conclusion of the simulation, an analysis may be made to assess the successful and unsuccessful strategies for each simulation loop 270, specifically, an analysis of actions undertaken in response to events occurring. In one example aspect, the most effective simulation loop may be the one whose actions ensure the highest coefficient of effectiveness of the elements of the enterprise model.

Figure 3:
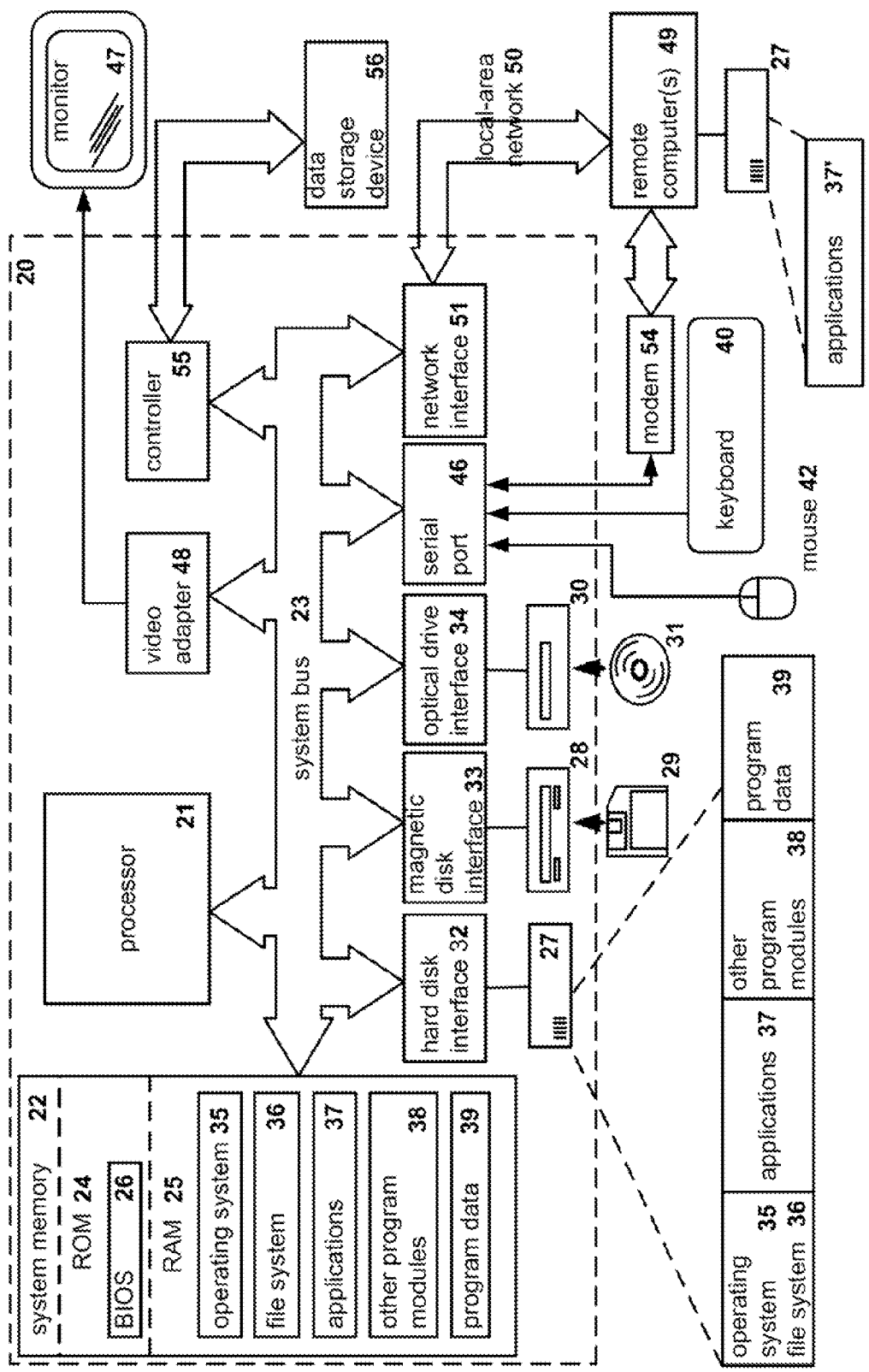
FIG. 3 illustrates an example of a general-purpose computer system, such as a personal computer or a server, suitable for implementing the disclosed aspects of systems and method for determining an information security level for an enterprise.

FIG. 3 shows an example of a general-purpose computer system (which may be a personal computer or a server) 20, which may be used to implement system and methods for determining an information security level for an enterprise disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading, and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for determining an information security level for an enterprise, the method comprising:
    collecting data relating to a structure of the enterprise including a plurality of elements, the plurality of elements including equipment and control systems for the equipment of the enterprise;
    creating, by a hardware processor, a model of an operation of the plurality of elements of the enterprise based on at least one function of each element that is determined from the collected data;
    identifying, by the hardware processor, criteria to evaluate the operation of the plurality of elements based the at least one function of each element;
    determining, by the hardware processor, a coefficient indicating a functional effectiveness of the plurality of elements of the enterprise based on the identified criteria;
    simulating, by the hardware processor, control of the enterprise by applying different sequences of events and actions to increase or decrease the coefficient, where the different sequences of events and actions are based on previous events for one or more simulation iterations using the at least one function of each element; and
    determining, the hardware processor, an information security level for the enterprise based on a value of the coefficient in response to the simulated control of the enterprise by applying the different sequences of events and actions.

2. The method of claim 1, wherein the events comprise one or more of: previously occurred events in the enterprise, events occurred in a different enterprise, random events, and events relating to malware attacks, user actions, and each element of the enterprise.

3. The method of claim 1, wherein each of the actions in response to the events is determined by one or more of: a name; a description; an impact on the one or more simulation iterations; a cost of implementing; a negative impact on an enterprise profit; an implementation time; a dependency on other actions or states of the enterprise; a permanency; and a priority in relation to other actions.

4. The method of claim 1, further comprising performing each of the one or more simulation iterations by obtaining an initial state for each element including at least one of: common events of the one or more simulation iterations with one or more obvious or hidden causes; individual events for each element; a combined profit of the enterprise for past iterations; and an enterprise profit of a last iteration.

5. The method of claim 4, wherein the individual events for each element comprise previously occurred events and action undertaken only for a specific element in a prior simulation.

6. The method of claim 1, further comprising analyzing results of the simulated control of the enterprise applying the different sequences of events and actions to determine a simulated control with a highest coefficient of the enterprise.

7. The method of claim 1, wherein each of the one or more simulation iterations comprises one or more simulation loops, the method further comprising:
    performing the one or more simulation loops in each of the one or more simulation iterations using a corresponding model for each element; and
    analyzing results of the one or more simulation loops for selecting the coefficient resulting from the simulated control of the enterprise based on a fuzzy logic analysis or a supplemental analysis.

8. The method of claim 1, further comprising determining a threshold for the actions in response to the events for each of the one or more simulation iterations based at least in part on a cost of performing the actions.

9. The method of claim 1, wherein the criteria comprise at least one of: a profit in a current simulation iteration; and overall profit of the enterprise after the current simulation iteration; and a working capability of production equipment and computer systems in and after the current simulation iteration.

10. A system or determining an information security level for an enterprise, the system comprising:
    a hardware processor; and a memory storing a software program that, when executed by the hardware processor, causes the hardware processor to:
    collect data relating to a structure of the enterprise including a plurality of elements, the plurality of elements including equipment and control systems for the equipment of the enterprise;
    create a model of an operation of the plurality of elements of the enterprise based on at least one function of each element that is determined from the collected data;
    identify criteria to evaluate the operation of the plurality of elements based the at least one function of each element;
    determine a coefficient indicating a functional effectiveness of the plurality of elements of the enterprise based on the identified criteria;
    simulate control of the enterprise by applying different sequences of events and actions to increase or decrease the coefficient, where the different sequences of events and actions are based on previous events for one or more simulation iterations using the at least one function of each element; and
    determine an information security level for the enterprise based on a value of the coefficient in response to the simulated control of the enterprise by applying the different sequences of events and actions.

11. The system of claim 10, wherein the events comprise one or more of: previously occurred events in the enterprise, events occurred in a different enterprise, random events, and events relating to malware attacks, user actions, and each element of the enterprise.

12. The system of claim 10, wherein each of the actions in response to the events is determined by one or more of: a name; a description; an impact on the one or more simulation iterations; a cost of implementing; a negative impact on an enterprise profit; an implementation time; a dependency on other actions or states of the enterprise; a permanency; and a priority in relation to other actions.

13. The system of claim 10, wherein the software program, when executed by the hardware processor, further causes the hardware processor to perform each of the one or more simulation iterations by obtaining an initial state for each element including at least one of: common events of the one or more simulation iterations with one or more obvious or hidden causes; individual events for each element; a combined profit of the enterprise for past iterations; and an enterprise profit of a last iteration.

14. The system of claim 13, wherein the individual events for each element comprise previously occurred events and action undertaken only for a specific element in a prior simulation.

15. The system of claim 10, wherein the software program, when executed by the hardware processor, further causes the hardware processor to analyze results of the simulated control of the enterprise applying the different sequences of events and actions to determine a simulated control with a highest coefficient of the enterprise.

16. The system of claim 10, wherein each of the one or more simulation iterations comprises one or more simulation loops, and the analysis module is further configured to:
    perform the one or more simulation loops in each of the one or more simulation iterations using a corresponding model for each element; and
    analyze results of the one or more simulation loops for selecting the coefficient resulting from the simulated control of the enterprise based on a fuzzy logic analysis or a supplemental analysis.

17. The system of claim 10, wherein the criteria to evaluate the effectiveness of the at least one function of each element comprise at least one of: a profit in a current simulation iteration; and overall profit of the enterprise after the current simulation iteration; and a working capability of production equipment and computer systems in and after the current simulation iteration.

18. A computer program product stored in a non-transitory computer-readable storage medium, the computer program product comprising computer-executable instructions for determining an information security level for an enterprise, including instructions for:
    collecting data relating to a structure of the enterprise including a plurality of elements, the plurality of elements including equipment and control systems for the equipment of the enterprise;
    creating a model of an operation of the plurality of elements of the enterprise based on at least one function of each element that is determined from the collected data;
    identifying criteria to evaluate the operation of the plurality of elements based the at least one function of each element;
    determining a coefficient indicating a functional effectiveness of the plurality of elements of the enterprise based on the identified criteria;
    simulating control of the enterprise by applying different sequences of events and actions to increase or decrease the coefficient, where the different sequences of events and actions are based on previous events for one or more simulation iterations using the at least one function of each element; and
    determining an information security level for the enterprise based on a value of the coefficient in response to the simulated control of the enterprise by applying the different sequences of events and actions.

* * * * *